United States Patent
Sundararajan et al.

(10) Patent No.: US 10,873,869 B2
(45) Date of Patent: Dec. 22, 2020

(54) CELL-SPECIFIC SOUNDING AND MEASUREMENT CONFIGURATION

(71) Applicant: QUALCOMM Incorporated, San Diego, CA (US)

(72) Inventors: Jay Kumar Sundararajan, San Diego, CA (US); Haitong Sun, Cupertino, CA (US); Aleksandar Damnjanovic, Del Mar, CA (US); Kambiz Azarian Yazdi, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 16/009,071

(22) Filed: Jun. 14, 2018

(65) Prior Publication Data

US 2018/0368017 A1    Dec. 20, 2018

Related U.S. Application Data

(60) Provisional application No. 62/521,344, filed on Jun. 16, 2017.

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0048* (2013.01); *H04W 52/34* (2013.01);
(Continued)

(58) Field of Classification Search
None
See application file for complete search history.

(56) References Cited

U.S. PATENT DOCUMENTS

| | | | | |
|---|---|---|---|---|
| 2010/0208608 A1* | 8/2010 | Wang | ................ | H04W 52/325 370/252 |
| 2016/0044689 A1* | 2/2016 | Wen | .................. | H04J 11/0023 370/330 |
| 2016/0050057 A1* | 2/2016 | Kim | .................. | H04J 11/0053 370/329 |

FOREIGN PATENT DOCUMENTS

WO    2011068995 A2    6/2011

OTHER PUBLICATIONS

Catt: "On Triggering of Aperiodic SRS via DL Grants," 3GPP Draft; R1-110054, 3rd Generation Partnership Project (3GPP), Mobile Competence Centre; 650, Route Des Lucioles; F-06921 Sophia-Antipolis Cedex, France, vol. RAN WG1, No. Dublin, Ireland; Jan. 17, 2011, Jan. 11, 2011, XP050490033, 3 pages, [retrieved on Jan. 11, 2011].

(Continued)

*Primary Examiner* — Christopher M Crutchfield
*Assistant Examiner* — Alan L Lindenbaum
(74) *Attorney, Agent, or Firm* — Loza & Loza, LLP/Qualcomm

(57) ABSTRACT

Aspects directed towards a cell-specific configuration for sounding transmissions and measurements are disclosed. In one example, scheduled entities served by a scheduling entity are identified and a cell-specific sounding pattern configuration uniformly applicable to each of the scheduled entities is generated such that the cell-specific sounding pattern configuration has a different pattern than a cell-specific sounding pattern configuration associated with at least one other cell. The cell-specific sounding pattern configuration is then transmitted to each of the scheduled entities to facilitate an identification of cell-specific resources to use for at least one of a sounding transmission or a sounding measurement. In another example, a cell-specific sounding pattern configuration is received and cell- (Continued)

specific resources associated with the cell-specific sounding pattern configuration are identified. At least one of a sounding transmission or a sounding measurement is then configured according to the cell-specific resources associated with the cell-specific sounding pattern configuration.

30 Claims, 11 Drawing Sheets

(51) Int. Cl.
    *H04W 52/34*     (2009.01)
    *H04W 72/08*     (2009.01)
    *H04W 72/12*     (2009.01)
    *H04W 52/32*     (2009.01)

(52) U.S. Cl.
    CPC ......... *H04W 72/085* (2013.01); *H04W 72/12* (2013.01); *H04L 5/0016* (2013.01); *H04L 5/0037* (2013.01); *H04W 52/325* (2013.01)

(56) References Cited

OTHER PUBLICATIONS

International Search Report and Written Opinion—PCT/US2018/037917—ISA/EPO—dated Sep. 10, 2018.

\* cited by examiner

CELL-SPECIFIC SOUNDING AND MEASUREMENT CONFIGURATION

CROSS-REFERENCE TO RELATED APPLICATION(S)

This application claims priority to and the benefit of U.S. Provisional Patent Application No. 62/521,344, filed on Jun. 16, 2017, the entire content of which is incorporated herein by reference as if fully set forth below in its entirety and for all applicable purposes.

TECHNICAL FIELD

The technology discussed below relates generally to wireless communication systems, and more particularly, to providing a user equipment (UE) with a cell-specific configuration for sounding transmissions and measurements.

INTRODUCTION

As the demand for mobile broadband access continues to increase, research and development continue to advance wireless communication technologies not only to meet the growing demand for mobile broadband access, but to advance and enhance the user experience with mobile communications. New radio access technologies, such as 5G new radio (NR) access technology, promise to make wireless broadband indistinguishable from wireline with fiber-like performance at a significantly lower cost-per-bit.

As wireless technology evolves, however, various types of interference become more problematic. For instance, during dynamic time division duplex (TDD) operation, cross-link interference is an important issue to consider. Cross-link interference may occur, for example, when a user equipment (UE) in a first cell performs a downlink operation, while a UE in a neighbor cell performs an uplink operation. In this case, if the transmitter UE in the neighbor cell causes significant interference at the receiver UE in the first cell, reception may be significantly disrupted at the receiver UE in the first cell. It would thus be beneficial for the network to be aware of such potential interference scenarios so that it can incorporate this knowledge in scheduling and power control decisions. Namely, it would be desirable to enable a scheduling entity (e.g., a gNB) to identify the interference level from UEs of a neighboring cell at each UE served by the scheduling entity.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a scheduling entity (e.g., a base station) are disclosed. In one example, a method is disclosed, which includes identifying a plurality of scheduled entities served by the scheduling entity. The method further includes generating a cell-specific sounding pattern configuration having at least one of a sounding transmission pattern or a sounding measurement pattern uniformly applicable to each of the plurality of scheduled entities and transmitting the cell-specific sounding pattern configuration to each of the plurality of scheduled entities served by the scheduling entity. For this particular example, the cell-specific sounding pattern configuration has a different pattern than a cell-specific sounding pattern configuration associated with at least one other cell (e.g., a neighbor cell), and also facilitates an identification of cell-specific resources to use for at least one of a sounding transmission or a sounding measurement.

In another aspect directed towards a scheduling entity, a wireless communication device is disclosed, which includes a processor communicatively coupled to each of a memory, a transceiver, an identifying circuitry, a generating circuitry, and a transmitting circuitry. For this example, the identifying circuitry is configured to identify a plurality of scheduled entities served by the scheduling entity, whereas the generating circuitry is configured to generate a cell-specific sounding pattern configuration having at least one of a sounding transmission pattern or a sounding measurement pattern uniformly applicable to each of the plurality of scheduled entities. Here, the cell-specific sounding pattern configuration has a different pattern than a cell-specific sounding pattern configuration associated with at least one other cell (e.g., a neighbor cell), and also facilitates an identification of cell-specific resources to use for at least one of a sounding transmission or a sounding measurement. The transmitting circuitry is then configured to transmit the cell-specific sounding pattern configuration to each of the plurality of scheduled entities served by the scheduling entity.

Various aspects directed towards a scheduled entity (e.g., a UE) are also disclosed. In a particular example, a method is disclosed, which includes receiving a cell-specific sounding pattern configuration having at least one of a sounding transmission pattern or a sounding measurement pattern uniformly applicable to each of a plurality of scheduled entities served by the scheduling entity. For this example, the cell-specific sounding pattern configuration has a different pattern than a cell-specific sounding pattern configuration associated with at least one other cell (e.g., a neighbor cell). The method then further includes identifying cell-specific resources associated with the cell-specific sounding pattern configuration and configuring at least one of a sounding transmission or a sounding measurement according to the cell-specific resources associated with the cell-specific sounding pattern configuration.

In another aspect directed towards a scheduled entity, a wireless communication device is disclosed, which includes a processor communicatively coupled to each of a memory, a transceiver, a receiving circuitry, an identifying circuitry, and a sounding circuitry. For this example, the receiving circuitry is configured to receive a cell-specific sounding pattern configuration having at least one of a sounding transmission pattern or a sounding measurement pattern uniformly applicable to each of a plurality of scheduled entities served by the scheduling entity, and where the cell-specific sounding pattern configuration has a different pattern than a cell-specific sounding pattern configuration associated with at least one other cell (e.g., a neighbor cell). The identifying circuitry is then configured to identify cell-specific resources associated with the cell-specific sounding pattern configuration, whereas the sounding circuitry is configured to configure at least one of a sounding transmission or a sounding measurement according to the cell-specific resources associated with the cell-specific sounding pattern configuration.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
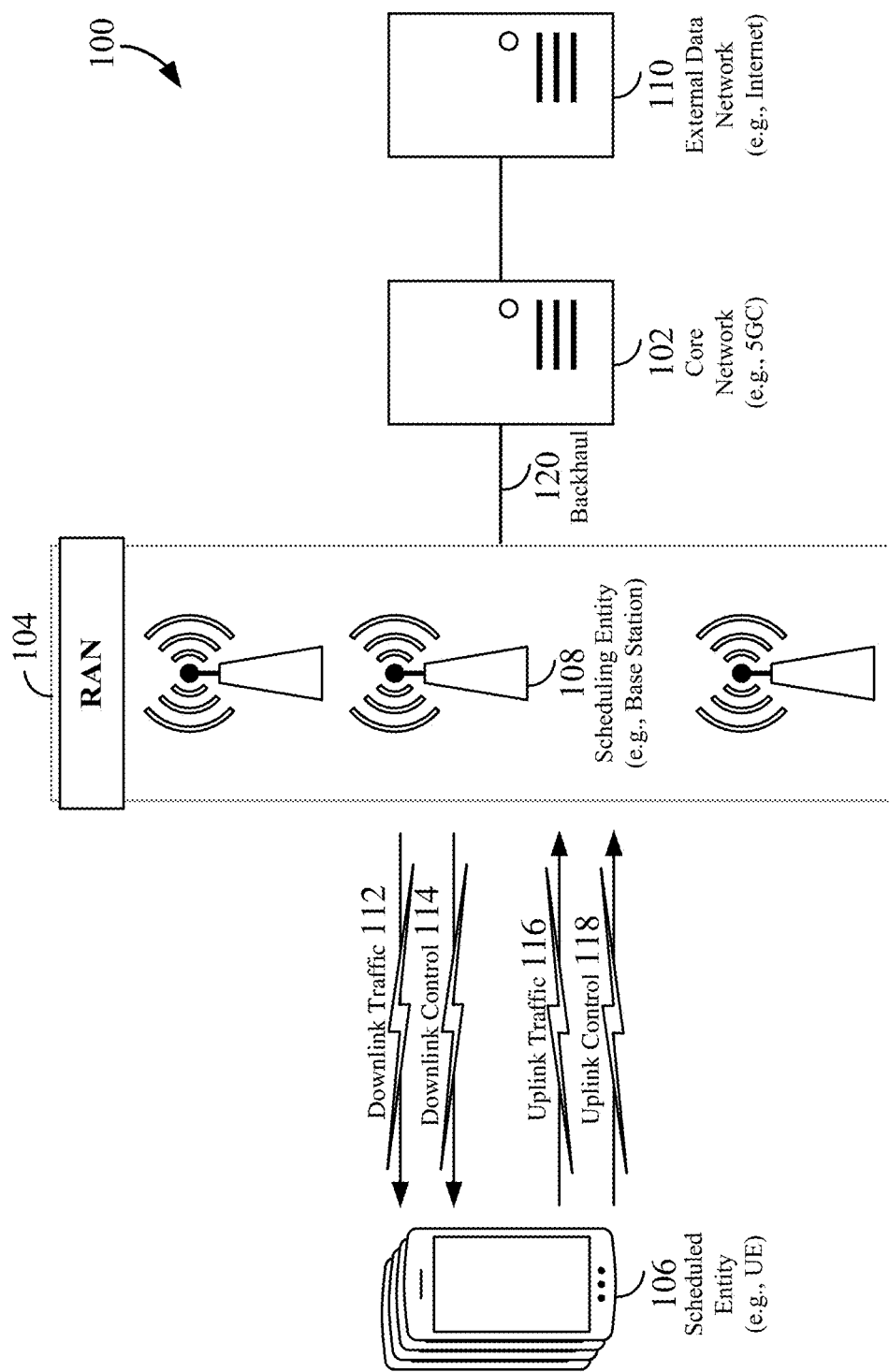
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

As previously stated, it would be desirable to enable a scheduling entity (e.g., a gNB) to identify the amount of user equipment (UE) interference caused by UEs of neighboring cells at each UE served by the scheduling entity. However, identifying the interference level for each served UE from every UE of every neighboring cell may be prohibitive in terms of sounding overhead. To this end, for each UE served by a scheduling entity, it should be noted that simply identifying whether there is strong interference, and how strong such interference will be, may be sufficient without identifying which other cell or UE causes it. Another consideration is that UEs typically have a half-duplex constraint (i.e., they cannot transmit and receive at the same time). Accordingly, it would be desirable to provide techniques for configuring UEs of a network with a sounding pattern that keeps the sounding overhead low and achieves the goals listed above in spite of various constraints, such as the half-duplex constraint.

As will be discussed in more detail herein, the present disclosure includes aspects directed towards providing a UE with a cell-specific configuration for sounding transmissions and measurements. To this end, although the aspects disclosed herein are primarily described within the context of UE-to-UE soundings, it should be appreciated that such aspects are also applicable within the context of NodeB-to-NodeB soundings. In a particular aspect, since UEs within the same cell do not need to sound to each other, it is contemplated that UEs served by the same cell may sound at the same time. Moreover, if a measuring UE is not required to identify the sounding UE or its cell based on the sounding, UEs within the same cell may, in addition to sounding at the same time, even use the same resources (such as resource blocks, code sequences, etc.). As a result, aspects disclosed herein include embodiments in which a sounding pattern configuration may be common to all UEs of the same cell, wherein such sounding pattern configurations may specify any of various parameters. Namely, it is contemplated that the sounding pattern configurations disclosed herein are cell-specific (i.e., all UEs in a particular cell receive the same configuration), wherein parameters specified in such configurations enable a UE to determine which slots and which resources (e.g., resource blocks, time symbols, code sequences, transmit power control parameters, etc.) within the slot are to be used for sounding transmissions, as well as which slots and which resources to use for measuring the detected sounding signal power levels of UEs in neighboring cells.

It should be appreciated that aspects disclosed herein include implementations for both a scheduling entity (e.g., a Node B) and a scheduled entity (e.g., a UE). For instance, with respect to a scheduling entity, aspects directed towards generating a cell-specific sounding pattern configuration are disclosed. Within such implementation, the scheduling entity then transmits the cell-specific sounding pattern configuration to all scheduled entities within a cell (e.g., via a unicast, multicast, or broadcast transmission). With respect to a scheduled entity, aspects directed towards performing a cell-specific sounding pattern configuration are disclosed. For this particular implementation, the scheduled entity receives a cell-specific sounding pattern configuration transmitted by a scheduling entity to all scheduled entities within a particular cell. The scheduled entity then utilizes the cell-specific sounding pattern configuration to determine which resources to use for transmitting sounding signals, and which resources to use for measuring sounding signals transmitted by UEs in neighboring cells.

DEFINITIONS

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

Duplex: a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and interference cancellation techniques. Full duplex emulation is frequently implemented for wireless links by utilizing frequency division duplex (FDD) or time division duplex (TDD). In FDD, the transmitter and receiver at each endpoint operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction.

OFDM: orthogonal frequency division multiplexing. An air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
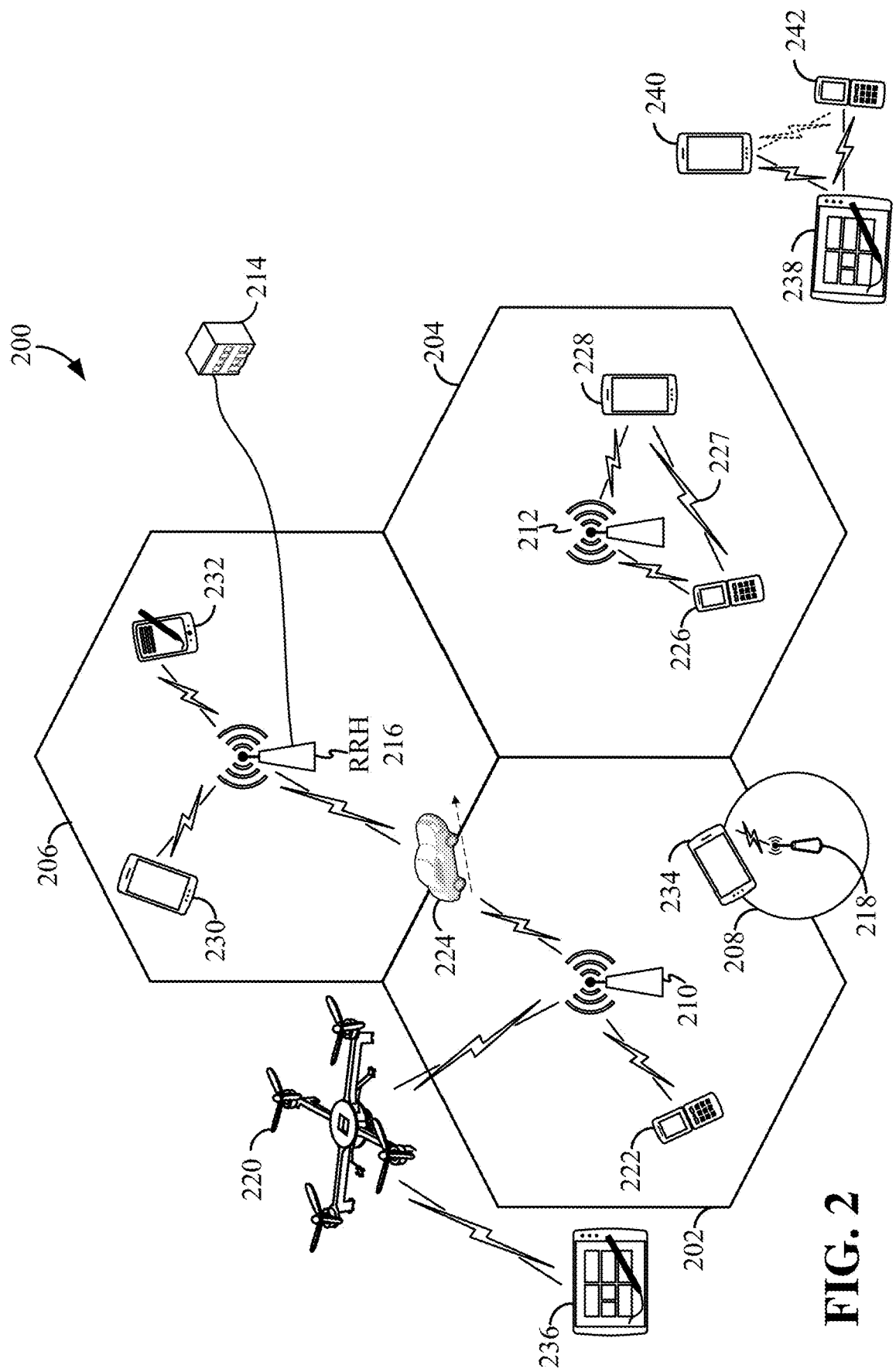
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
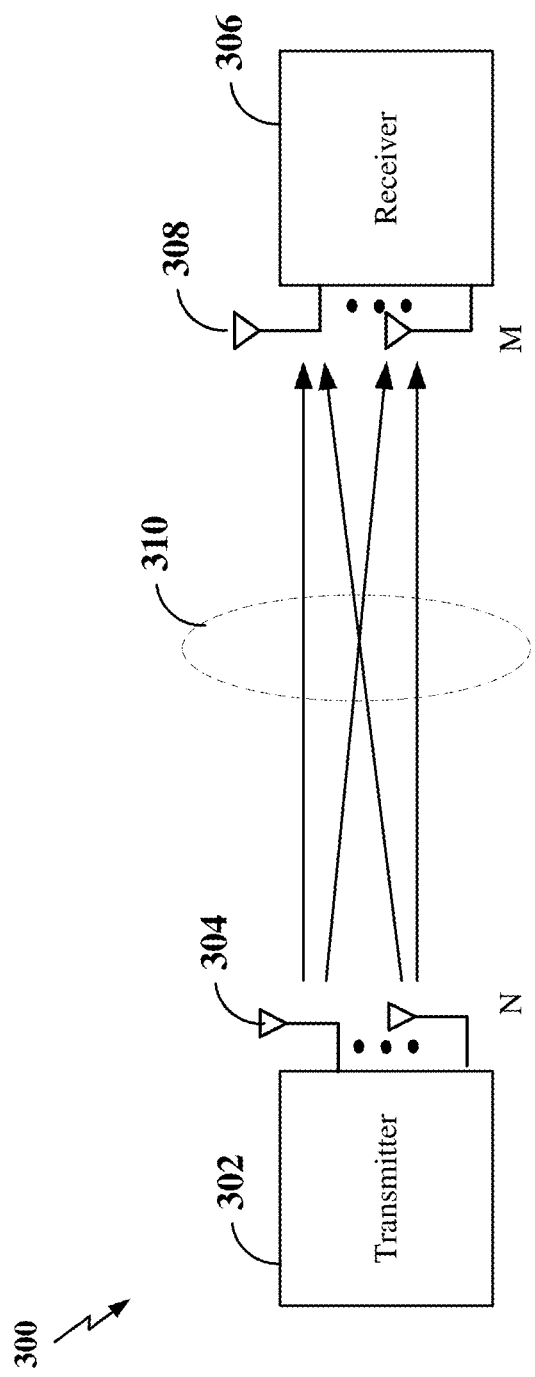
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC- FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
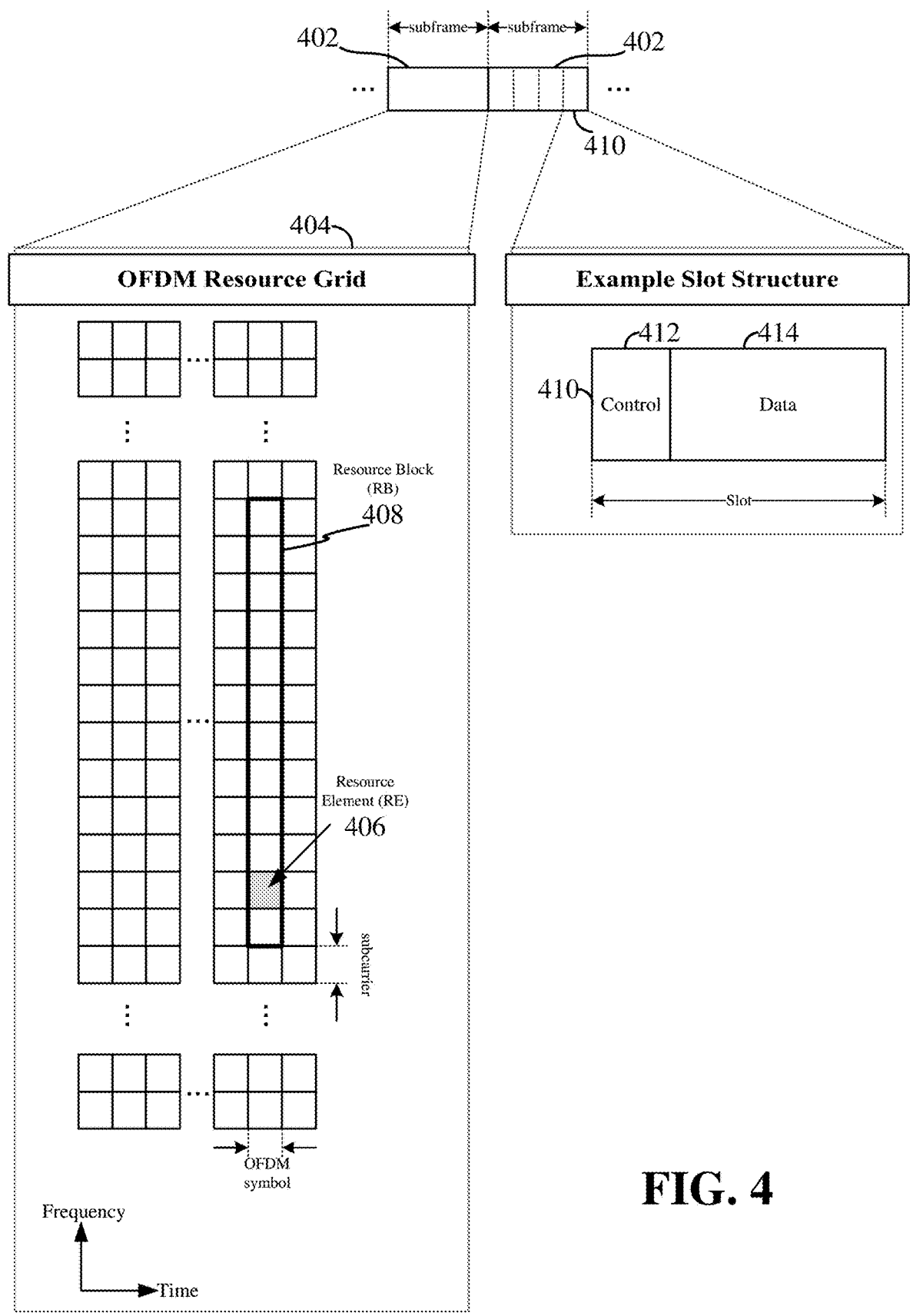
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Exemplary Implementation of Cell-Specific Sounding Pattern Configuration

Figure 5:
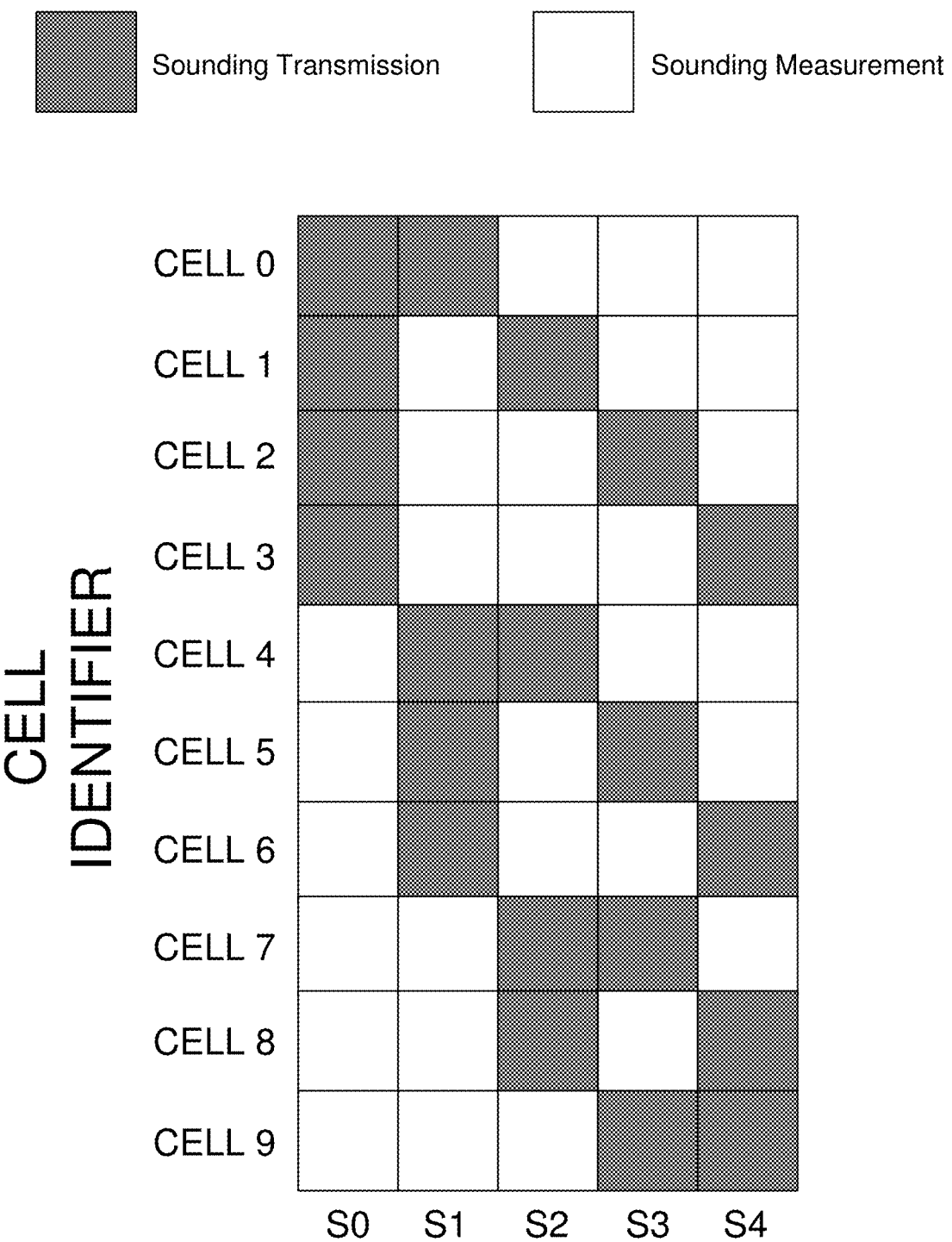
FIG. 5 is a diagram illustrating an exemplary sounding and measurement pattern for various cells in accordance with some aspects of the present disclosure.

As previously discussed, aspects disclosed herein are directed towards providing a user equipment (UE) with a cell-specific configuration for sounding transmissions and measurements. FIG. 5, illustrates a diagram of an exemplary sounding and measurement pattern for various cells in accordance with some aspects of the present disclosure. As illustrated, the shaded blocks correspond to sounding transmission opportunities (e.g., symbols allocated for sounding transmissions, wherein such symbols need not occur consecutively), whereas the unshaded blocks correspond to sounding measurement opportunities (e.g., symbols allocated for sounding measurements, wherein such symbols need not occur consecutively). It should be noted that, although each cell listed in FIG. 5 follows a different sounding/measurement pattern, the pattern associated with a particular cell is common to all UEs within that cell. It should be further noted that the sounding/measurement patterns illustrated in FIG. 5 enable UEs in a particular cell to listen to UEs in every other cell, despite the aforementioned half-duplex constraint (i.e., they cannot transmit and receive at the same time).

Although a particular set of cell/symbol sounding pattern configurations is illustrated in FIG. 5, it should be appreciated that any of various alternative cell/symbol sounding pattern configurations can be implemented. For instance, although FIG. 5 associates Cell 0 with a sounding pattern in which symbols S0 and S1 are allocated for sounding transmissions, an alternative configuration may be implemented in which the sounding pattern associated with Cell 0 is switched with the sounding pattern associated with Cell 8, for example. In such alternative configuration, Cell 0 would then be associated with a sounding pattern in which symbols S2 and S4 are allocated for sounding transmissions, and Cell 8 would now be associated with a sounding pattern in which symbols S0 and S1 are allocated for sounding transmissions.

Furthermore, although FIG. 5 illustrates a sounding pattern for ten cells (i.e., Cell 0, Cell 1 . . . Cell 9) across five symbols (i.e., S0, S1 . . . S4), such dimensions may vary. For instance, the number of available configuration patterns P may vary according to the number of cells N; the desired total number of symbols T used per cell for sounding transmissions and sounding measurements; and the desired number of symbols K used per cell for sounding transmissions (where K$>=$1). Namely, it is contemplated that the number of available configuration patterns P will vary depending on the particular values selected for T and K, such that P$>=$N. For instance, with respect to the sounding patterns illustrated in FIG. 5, the number of available configuration patterns P is 10, since the number of cells N is 10; the total number of sounding/measurement symbols per cell T is 5; and the number of sounding transmission opportunities per cell K is 2. Furthermore, if we let $A_j$ be the $j^{th}$ K-sized subset of T symbols (for j=1, 2, . . . P), it is contemplated that all UEs in cell j will be configured to transmit soundings within the symbols of $A_j$ and measure soundings from UEs in neighboring cells within the remaining subset of T symbols.

In another aspect of the disclosure, although the exemplary sounding patterns illustrated in FIG. 5 show patterns over the time domain, it is contemplated that such patterns may also be defined jointly over time, frequency, and code sequence domains. For instance, because the sounding patterns illustrated in FIG. 5 for each of Cell 0, Cell 1, Cell 2, and Cell 3 show that symbol S0 is allocated for sounding transmissions, it may be desirable to assign each cell a different carrier within symbol S0 for such sounding transmissions.

In a further aspect of the disclosure, it is contemplated that separate power control parameters used for transmitting a sounding signal may also be conveyed as part of, or along with, the aforementioned sounding pattern configurations. Within such embodiment, it should be appreciated that UEs may be configured to operate according to any of various power control modes. For instance, a first mode is contemplated in which a fixed reference power is used for all UEs; a second mode is contemplated in which power control is derived by the UE from power control parameters associated with particular uplink channels (e.g., from SRS or PUSCH power control parameters); and a third mode is contemplated in which power control is derived by the UE using a fixed reference power with a UE-specific offset determined by the UE (wherein such offset may incorporate information about traffic load level, priority, tolerable interference level, etc.).

As previously stated, a sounding measurement pattern may be configured in a manner that is common to all UEs within a cell. To this end, it should be appreciated that such measurement pattern configuration may specify any of various items. For instance, a measurement pattern configuration may specify which sets of resources to use for each measurement (e.g., where multiple sets may be configured), as well as what to measure on the resource (e.g., reference signal received power (RSRP), signal-to-interference-and-noise ratio (SINR), received signal strength indicator (RSSI), etc.).

The measurement pattern configurations disclosed herein may also be used to specify items associated with reporting. For instance, a measurement pattern configuration may specify how to combine all the measurements from different resources for reporting purposes. Within such embodiment, the multiple measurements may all be reported individually, or an aggregate value may be reported. For example, to identify the dominant interference, it may be sufficient to report the maximum of all the measurements, which can be specified in a measurement pattern configuration. When to trigger a report may also be specified in a measurement pattern configuration (e.g., measurement events may be configured based on the measurements exceeding a pre-configured threshold).

In another aspect of the disclosure, it should be appreciated that the sounding and measurement pattern configuration may be unicast, multicast, or broadcast to all UEs of a particular cell (e.g., using one or more of: a group-common PDCCH in a per-slot manner; RRC messages in a semi-static manner; and/or system information). In a particular example, it is contemplated that the network may configure a default pattern in the system information and may override the pattern for some slots using PDCCH.

Upon receiving a configuration from the network, a UE may then identify the resource sets to use for sounding and measurement based on the received configuration, along with other information (e.g., the cell ID, slot number, resource index within a slot (symbol, RB index), etc.). In addition, the UE may apply certain rules to further determine whether to enable the sounding and measurement mechanism on the identified resources. For example, the mechanism may be enabled only if the UE has traffic activity, which could be determined based on various factors (e.g., whether the UE is in connected mode or idle mode, whether discontinuous reception mode (DRX) is enabled or not, buffer status, etc.).

One of ordinary skill in the art will appreciate that various benefits are achieved by implementing the aspects disclosed herein. For instance, the sounding and measurement pattern configurations disclosed herein desirably facilitate cross-link UE-to-UE interference measurement and reporting. Also, by ensuring that such configurations are common to UEs within a particular cell, efficient delivery of these configurations is achieved with limited overhead.

Exemplary Scheduling Entity

Figure 6:
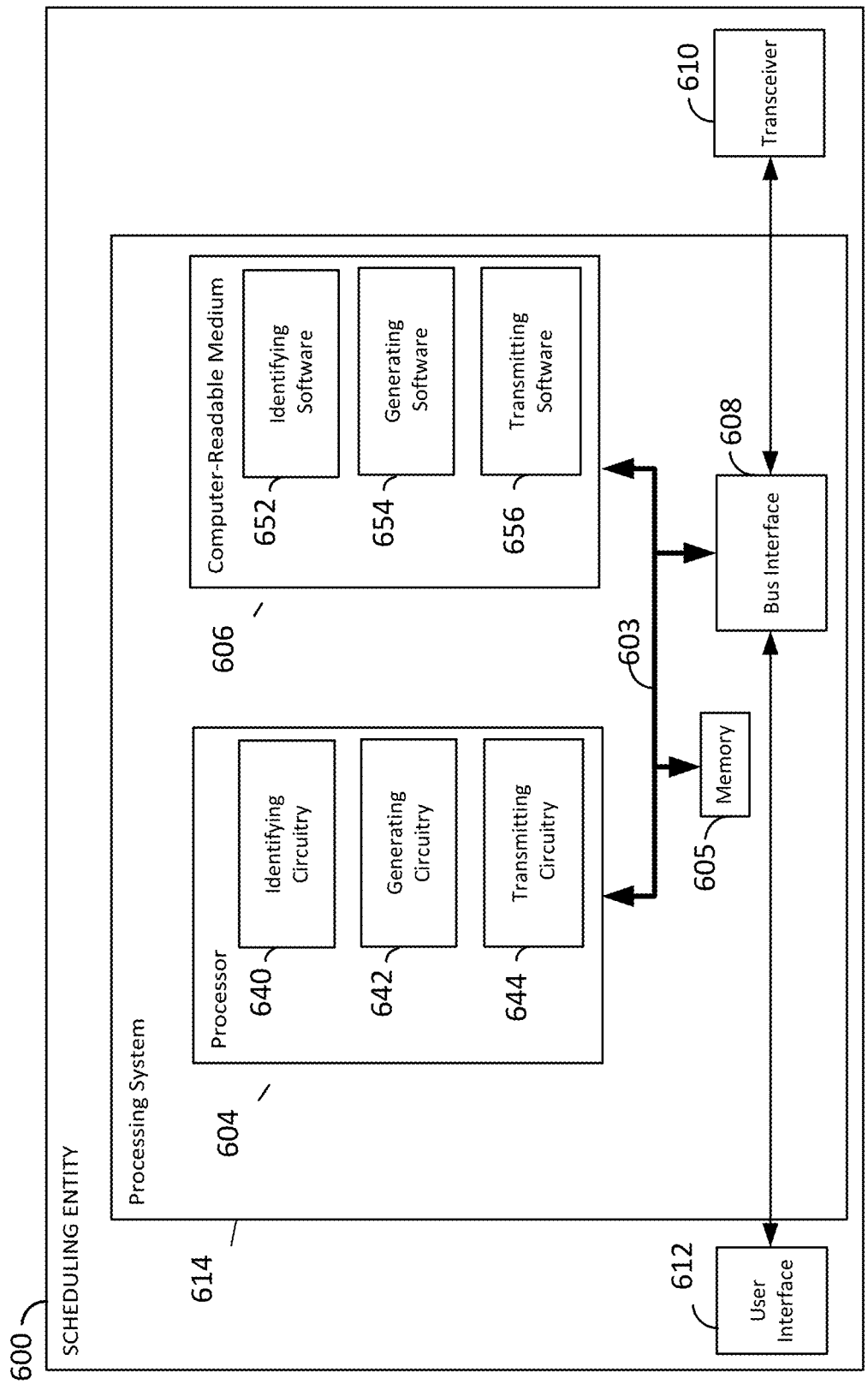
FIG. 6 is a block diagram illustrating an example of a hardware implementation for a scheduling entity employing a processing system.

FIG. 6 is a block diagram illustrating an example of a hardware implementation for a scheduling entity 600 employing a processing system 614. For example, the scheduling entity 600 may be a user equipment (UE) as illustrated in any one or more of the figures disclosed herein. In another example, the scheduling entity 600 may be a base station as also illustrated in any one or more of the figures disclosed herein.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 604, as utilized in a scheduling entity 600, may be used to implement any one or more of the processes and procedures described below and illustrated in FIG. 8.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided.

In some aspects of the disclosure, the processor 604 may include an identifying circuitry 640 configured for various functions, including, for example, to identify a plurality of scheduled entities served by the scheduling entity 600. As illustrated, the processor 604 may also include a generating circuitry 642 configured for various functions. For instance, the generating circuitry 642 may be configured to generate a cell-specific sounding pattern configuration having at least one of a sounding transmission pattern or a sounding measurement pattern uniformly applicable to each of the plurality of scheduled entities. Here, it is contemplated that the cell-specific sounding pattern configuration has a different pattern than a cell-specific sounding pattern configuration associated with at least one other cell (e.g., a neighbor cell), and that the cell-specific sounding pattern configuration facilitates an identification of cell-specific resources to use for at least one of a sounding transmission or a sounding measurement. The processor 604 may further include transmitting circuitry 644 configured for various functions, including, for example, to transmit the cell-specific sounding pattern configuration to each of the plurality of scheduled entities served by the scheduling entity 600 (e.g., via a unicast, multicast, or broadcast transmission). It should also be appreciated that, the combination of the identifying circuitry 640, the generating circuitry 642, and the transmitting circuitry 644 may be configured to implement one or more of the functions described herein.

Various other aspects for scheduling entity 600 are also contemplated. For instance, it is contemplated that the generating circuitry 642 may be configured to generate any of various types of cell-specific sounding patterns. Indeed, with reference to FIG. 5, although the exemplary sounding patterns show patterns over the time domain, it is contemplated that the generating circuitry 642 may be configured to define cell-specific sounding pattern configurations jointly over at least two of a time domain, a frequency domain, or a code sequence domain. Moreover, it is contemplated that the cell-specific sounding pattern configuration may be a joint configuration over the at least two of the time domain, the frequency domain, or the code sequence domain that is different than a joint configuration of at least one other cell (e.g., a neighbor cell). For instance, because the sounding patterns illustrated in FIG. 5 for each of Cell 0, Cell 1, Cell 2, and Cell 3 show that symbol S0 is allocated for sounding transmissions, it may be desirable to have the generating circuitry 642 assign each cell a different carrier within symbol S0 for such sounding transmissions.

Referring back to the remaining components of scheduling entity 600, it should be appreciated that the processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 606 may include identifying software 652 configured for various functions, including, for example, to identify a plurality of scheduled entities served by the scheduling entity 600. As illustrated, the computer-readable storage medium 606 may also include generating software 654 configured for various functions. For instance, the generating software 654 may be configured to generate a cell-specific sounding pattern configuration having at least one of a sounding transmission pattern or a sounding measurement pattern uniformly applicable to each of the plurality of scheduled entities. Here, it is again contemplated that the cell-specific sounding pattern configuration has a different pattern than a cell-specific sounding pattern configuration associated with at least one other cell (e.g., a neighbor cell), and that the cell-specific sounding pattern configuration facilitates an identification of cell-specific resources to use for at least one of a sounding transmission or a sounding measurement. The computer-readable storage medium 606 may further include transmitting software 656 configured for various functions, including, for example, to transmit the cell-specific sounding pattern configuration to each of the plurality of scheduled entities served by the scheduling entity 600 (e.g., via a unicast, multicast, or broadcast transmission).

In a particular configuration, it is also contemplated that the scheduling entity 600 includes means for identifying scheduled entities served by the scheduling entity 600, means for generating a cell-specific sounding pattern configuration uniformly applicable to the scheduled entities, and means for transmitting the cell-specific sounding pattern configuration to the scheduled entities. In one aspect, the aforementioned means may be the processor(s) 604 configured to perform the functions recited by the aforementioned means. In another aspect, the aforementioned means may be a circuit or any apparatus configured to perform the functions recited by the aforementioned means.

Figure 8:
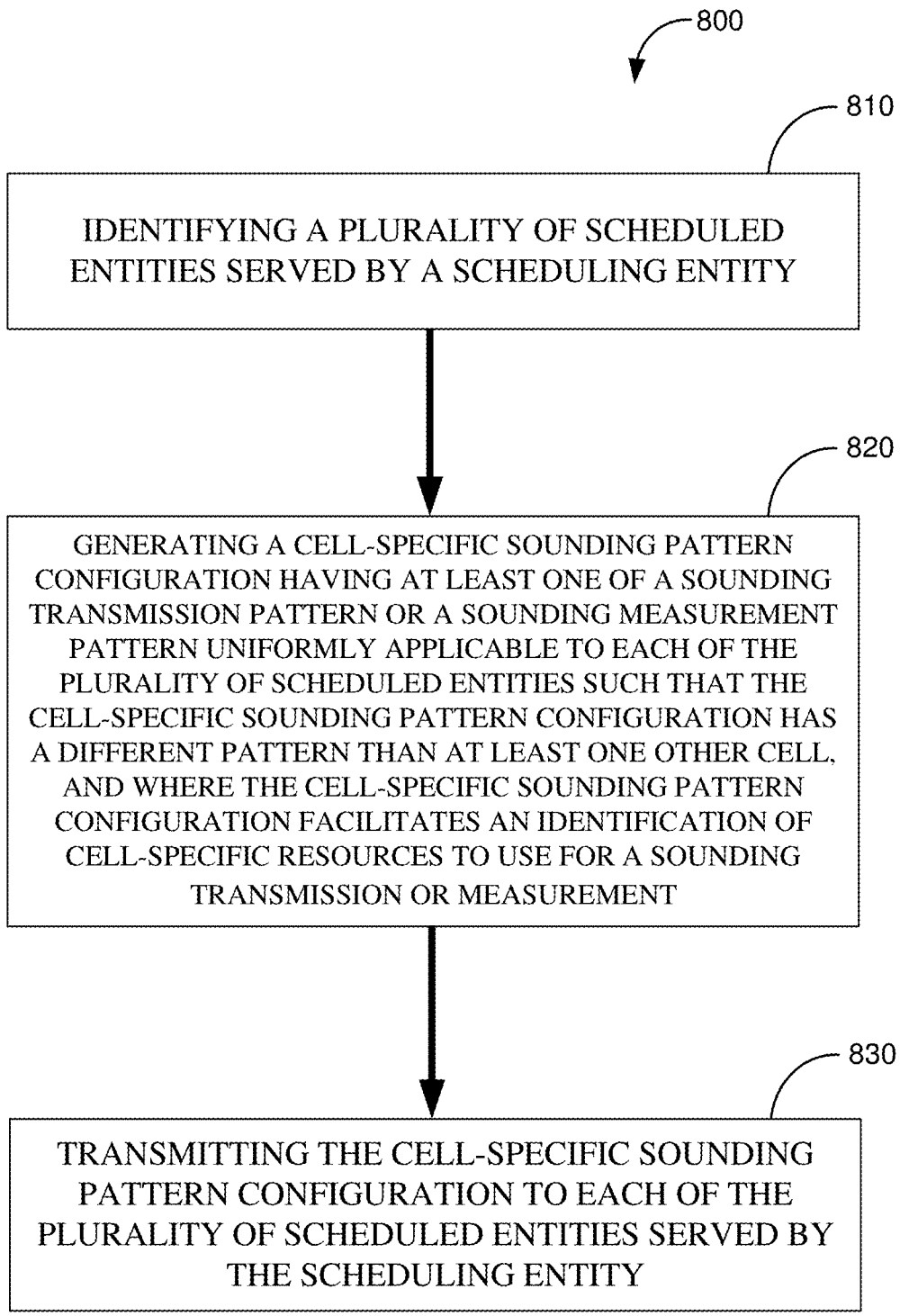
FIG. 8 is a flow chart illustrating an exemplary process for transmitting a cell-specific sounding pattern configuration in accordance with some aspects of the present disclosure.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described herein and utilizing, for example, the processes and/or algorithms described in relation to FIG. 8.

Figure 7:
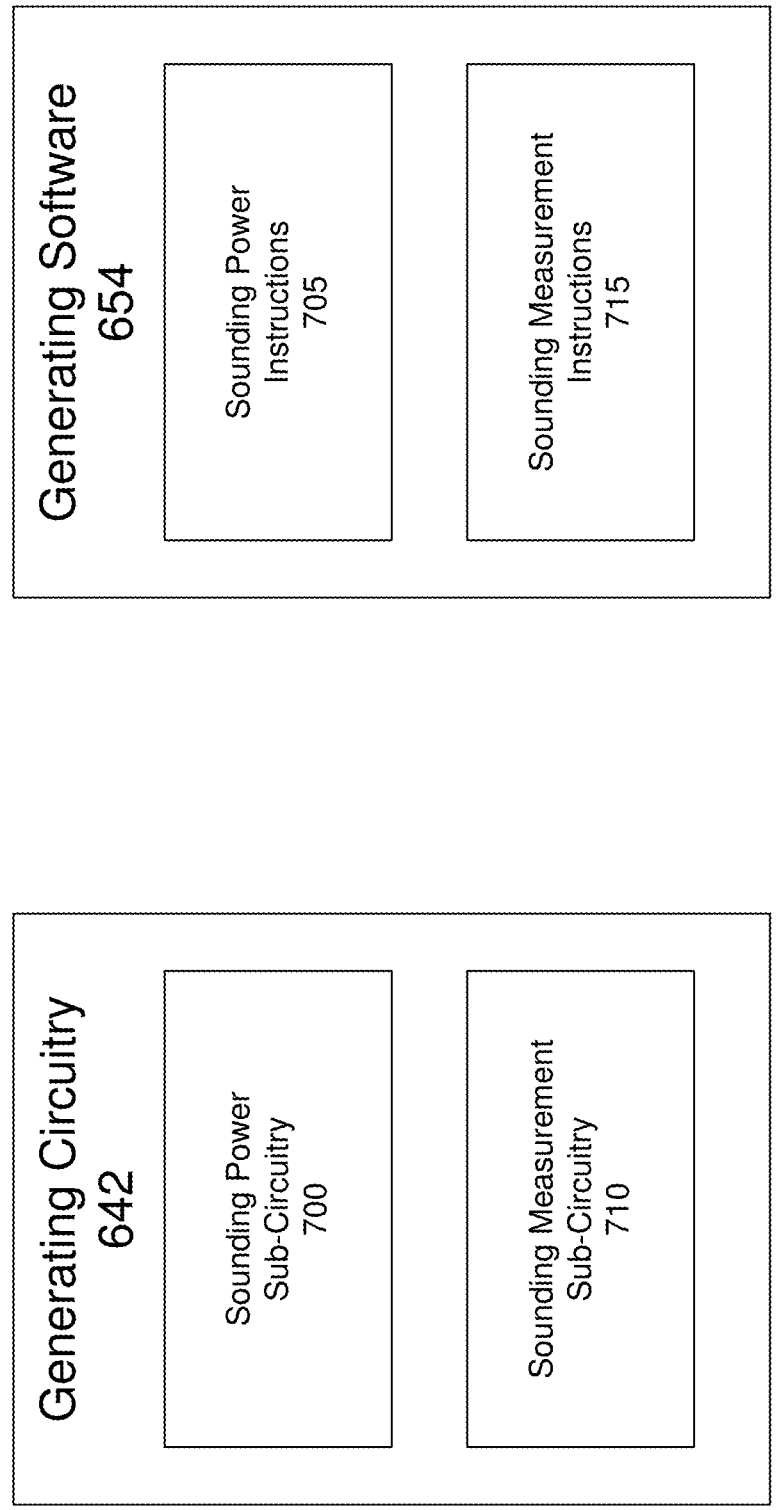
FIG. 7 is a block diagram illustrating exemplary subcomponents corresponding to the scheduling entity illustrated in FIG. 6.

Referring next to FIG. 7, exemplary sub-components of generating circuitry 642 and generating software 654 are provided. As illustrated, generating circuitry 642 may comprise sounding power sub-circuitry 700 and sounding measurement sub-circuitry 710; whereas generating software 654 may comprise sounding power instructions 705 and sounding measurement instructions 715.

In a particular implementation, it is contemplated that sounding power sub-circuitry 700 and/or sounding power instructions 705 are configured to convey a power mode to at least one of the plurality of scheduled entities served by the scheduling entity 600, wherein the power mode has corresponding power control parameters associated with the sounding transmission. For instance, the sounding power sub-circuitry 700 and/or sounding power instructions 705 may be configured to instruct at least one of the plurality of scheduled entities to perform a power control derivation based on the power control parameters and an offset specific to the at least one of the plurality of scheduled entities. Within such implementation, the sounding power sub-circuitry 700 and/or sounding power instructions 705 may then be further configured to determine the offset based on any of various parameters (e.g., a traffic load level, a priority, and/or a tolerable interference level).

Alternatively, the sounding power sub-circuitry 700 and/or sounding power instructions 705 may be configured to convey a power mode associated with a fixed reference power. For example, the sounding power sub-circuitry 700 and/or sounding power instructions 705 may be configured to convey to each of the plurality of scheduled entities that a corresponding sounding transmission shall be transmitted according to the fixed reference power. Alternatively, the sounding power sub-circuitry 700 and/or sounding power instructions 705 may be configured to instruct at least one of the plurality of scheduled entities to perform a power control derivation based on power control parameters associated with a particular uplink channel.

In another aspect of the disclosure, it is contemplated that the sounding measurement sub-circuitry 710 and/or sounding measurement instructions 715 may be configured to generate a cell-specific measurement pattern configuration. For instance, it is contemplated that the cell-specific measurement pattern configuration may specify a type of measurement to perform on a particular set of resources. It is also contemplated that the sounding measurement sub-circuitry 710 and/or sounding measurement instructions 715 may be configured to generate a cell-specific measurement pattern configuration that specifies items associated with reporting a corresponding sounding measurement. For instance, the cell-specific measurement pattern configuration may specify how to report multiple sounding measurements measured via different resources (e.g., an individual reporting of each of the multiple sounding measurements, an aggregate value associated with the multiple sounding measurements, etc.). It is also contemplated that the cell-specific measurement pattern configuration may specify a trigger for reporting the corresponding sounding measurement.

In FIG. 8, a flow chart is provided, which illustrates an exemplary scheduling entity process that facilitates some aspects of the disclosure. As described below, some or all illustrated features may be omitted in a particular implementation within the scope of the present disclosure, and some illustrated features may not be required for implementation of all embodiments. In some examples, the process 800 may be carried out by the scheduling entity 600 illustrated in FIG. 6. In some examples, the process 800 may be carried out by any suitable apparatus or means for carrying out the functions or algorithm described below.

Process 800 begins at block 810 with the scheduling entity 600 identifying a plurality of scheduled entities served by the scheduling entity 600. Process 800 then proceeds to block 820 where the scheduling entity 600 generates a cell-specific sounding pattern configuration having at least one of a sounding transmission pattern or a sounding measurement pattern uniformly applicable to each of the plurality of scheduled entities such that the cell-specific sounding pattern configuration has a different pattern than at least one other cell (e.g., a neighbor cell). It is also contemplated that the cell-specific sounding pattern configuration facilitates an identification of cell-specific resources to use for a sounding transmission or measurement. Process 800 then concludes at block 830 where the scheduling entity 600 transmits the cell-specific sounding pattern configuration to each of the plurality of scheduled entities served by the scheduling entity 600 (e.g., via a unicast, multicast, or broadcast transmission).

Exemplary Scheduled Entity

Figure 9:
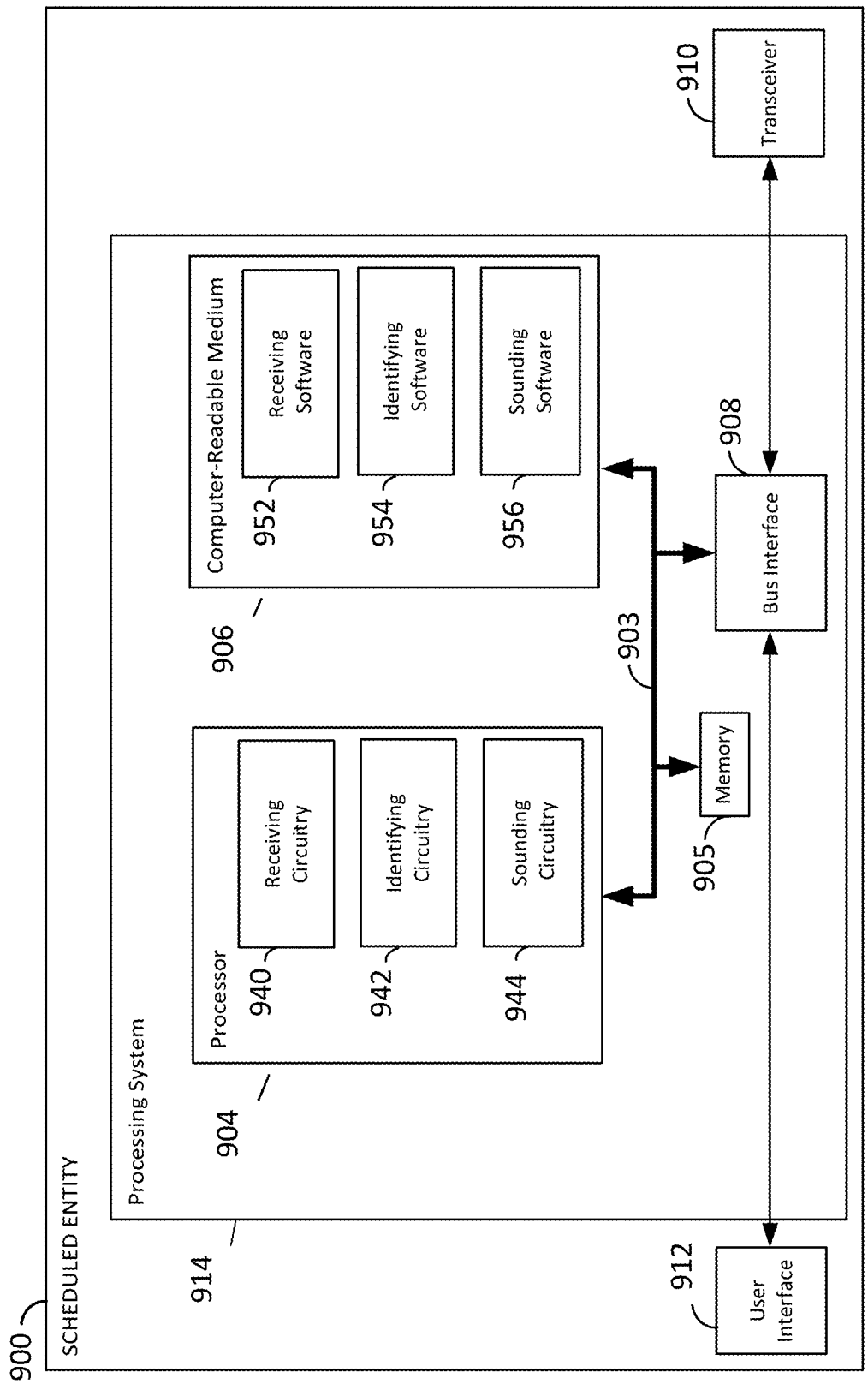
FIG. 9 is a block diagram illustrating an example of a hardware implementation for a scheduled entity employing a processing system.

FIG. 9 is a conceptual diagram illustrating an example of a hardware implementation for an exemplary scheduled entity 900 employing a processing system 914. In accordance with various aspects of the disclosure, an element, or any portion of an element, or any combination of elements may be implemented with a processing system 914 that includes one or more processors 904. For example, the scheduled entity 900 may be a user equipment (UE) as illustrated in any one or more of the FIGs. disclosed herein.

The processing system 914 may be substantially the same as the processing system 614 illustrated in FIG. 6, including a bus interface 908, a bus 902, memory 905, a processor 904, and a computer-readable medium 906. Furthermore, the scheduled entity 900 may include a user interface 912 and a transceiver 910 substantially similar to those described above in FIG. 6. That is, the processor 904, as utilized in a scheduled entity 900, may be used to implement any one or more of the processes described below and illustrated in the various figures.

In some aspects of the disclosure, the processor 904 may include a receiving circuitry 940 configured for various functions, including, for example, to receive a cell-specific sounding pattern configuration having at least one of a sounding transmission pattern or a sounding measurement pattern uniformly applicable to each of a plurality of scheduled entities served by a scheduling entity (e.g., via a unicast, multicast, or broadcast transmission). Here, it is contemplated that the cell-specific sounding pattern configuration has a different pattern than a cell-specific sounding pattern configuration associated with at least one other cell (e.g., a neighbor cell). As illustrated, the processor 904 may also include identifying circuitry 942 configured for various functions. For instance, identifying circuitry 942 may be configured to identify cell-specific resources associated with the cell-specific sounding pattern configuration. The processor 904 may further include sounding circuitry 944 configured for various functions, including, for example, to configure at least one of a sounding transmission or a sounding measurement according to the cell-specific resources associated with the cell-specific sounding pattern configuration. It should also be appreciated that, the combination of the receiving circuitry 940, the identifying circuitry 942, and the sounding circuitry 944 may be configured to implement one or more of the functions described herein.

Various other aspects for scheduled entity 900 are also contemplated. For instance, it is contemplated that the sounding circuitry 944 may be configured to configure any of various types of cell-specific sounding patterns. With reference to FIG. 5, for example, although the exemplary sounding patterns show patterns over the time domain, it is contemplated that the sounding circuitry 944 may be configured to configure cell-specific sounding pattern configurations jointly over at least two of a time domain, a frequency domain, or a code sequence domain. Moreover, it is contemplated that the cell-specific sounding pattern configuration may be a joint configuration over the at least two of the time domain, the frequency domain, or the code sequence domain that is different than a joint configuration of at least one other cell (e.g., a neighbor cell). For instance, because the sounding patterns illustrated in FIG. 5 for each of Cell 0, Cell 1, Cell 2, and Cell 3 show that symbol S0 is allocated for sounding transmissions, it may be desirable to assign each cell a different carrier within symbol S0 for such sounding transmissions.

Similar to processor 604, processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. Similar to computer-readable medium 606, computer-readable medium 906 may be a non-transitory computer-readable medium comprising characteristics that are substantially similar. The computer-readable medium 906 may reside in the processing system 914, external to the processing system 914, or distributed across multiple entities including the processing system 914. It should also be appreciated that, similar to computer-readable medium 606, computer-readable medium 906 may be embodied in a computer program product comprising characteristics that are substantially similar.

In one or more examples, the computer-readable storage medium 906 may include receiving software 952 configured for various functions, including, for example, to receive a cell-specific sounding pattern configuration having at least one of a sounding transmission pattern or a sounding measurement pattern uniformly applicable to each of a plurality of scheduled entities served by a scheduling entity (e.g., via a unicast, multicast, or broadcast transmission). Here, it is again contemplated that the cell-specific sounding pattern configuration has a different pattern than a cell-specific sounding pattern configuration associated with at least one other cell (e.g., a neighbor cell). As illustrated, the computer-readable medium 906 may also include identifying software 954 configured for various functions. For instance, identifying software 954 may be configured to identify cell-specific resources associated with the cell-specific sounding pattern configuration. The computer-readable medium 906 may further include sounding software 956 configured for various functions, including, for example, to configure at least one of a sounding transmission or a sounding measurement according to the cell-specific resources associated with the cell-specific sounding pattern configuration. It should also be appreciated that, the combination of the receiving software 952, the identifying software 954, and the sounding software 956 may be configured to implement one or more of the functions described herein.

In a particular configuration, it is also contemplated that the scheduled entity 900 includes means for receiving a cell-specific sounding pattern configuration, means for identifying cell-specific resources associated with the cell-specific sounding pattern configuration, and means for configuring a sounding transmission or measurement according to the cell-specific resources associated with the cell-specific sounding pattern configuration. In one aspect, the aforementioned means may be the processor(s) 904 configured to perform the functions recited by the aforementioned means. In another aspect, the aforementioned means may be a circuit or any apparatus configured to perform the functions recited by the aforementioned means.

Figure 11:
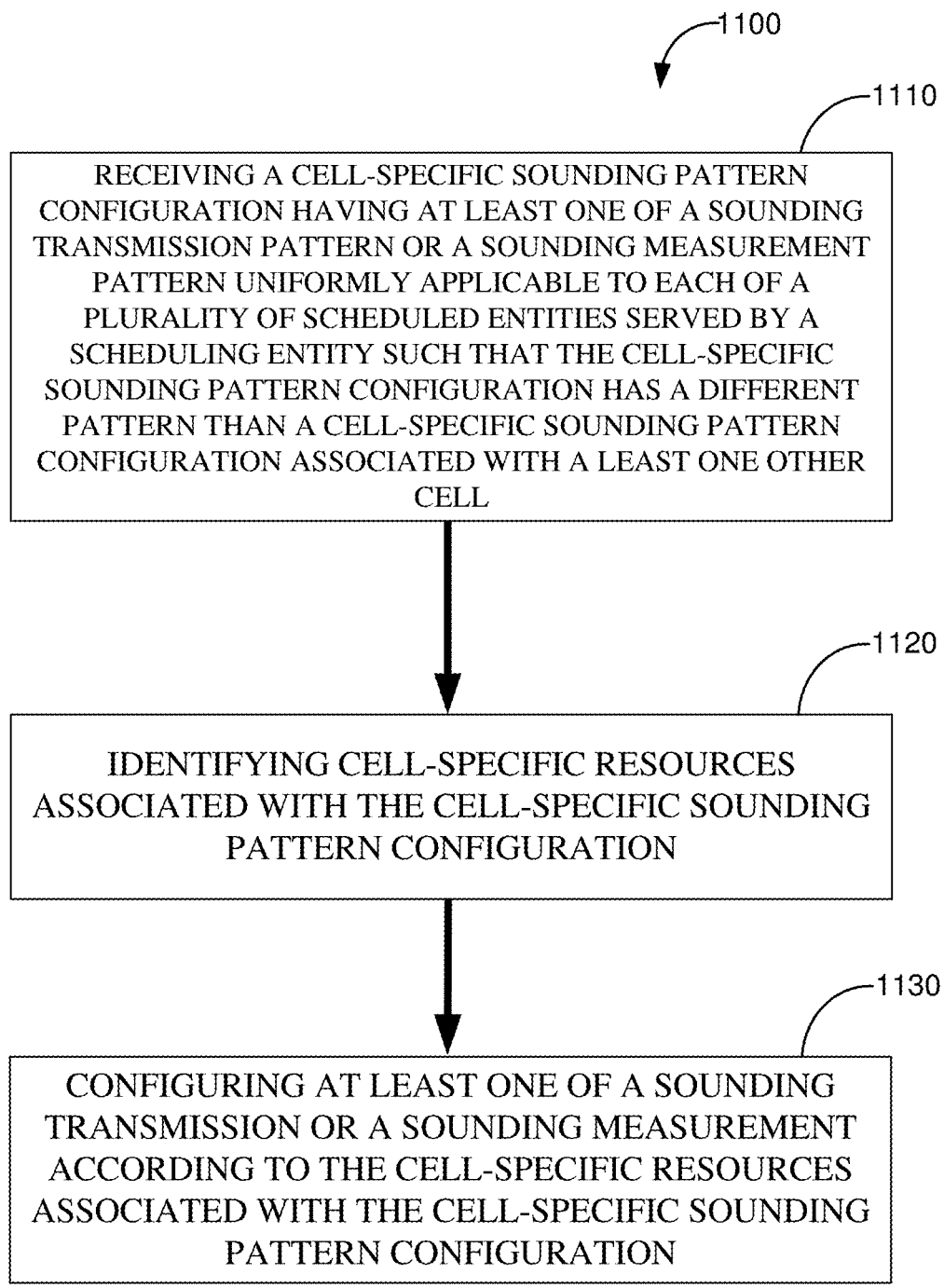
FIG. 11 is a flow chart illustrating an exemplary process for performing a cell-specific sounding pattern configuration in accordance with some aspects of the present disclosure.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described herein, and utilizing, for example, the processes and/or algorithms described in relation to FIG. 11.

Figure 10:
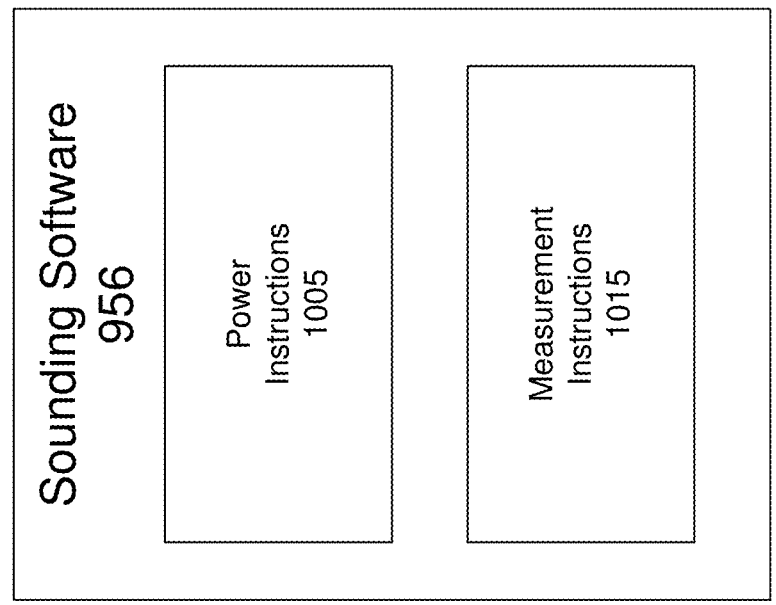
FIG. 10 is a block diagram illustrating exemplary subcomponents corresponding to the scheduled entity illustrated in FIG. 9.
Figure 10:
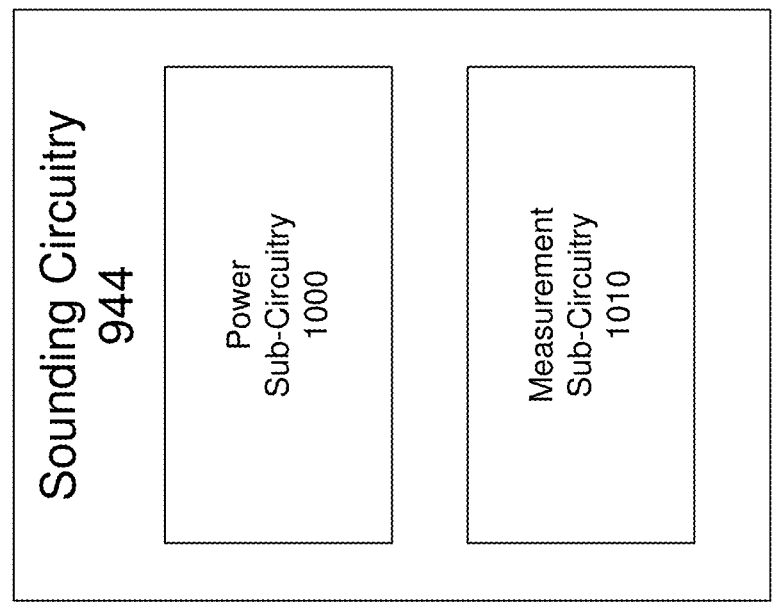

Referring next to FIG. 10, exemplary sub-components of sounding circuitry 944 and sounding software 956 are provided. As illustrated, sounding circuitry 944 may comprise power sub-circuitry 1000 and measurement sub-circuitry 1010; whereas sounding software 956 may comprise power instructions 1005 and measurement instructions 1015.

In a particular implementation, it is contemplated that the power sub-circuitry 1000 and/or power instructions 1005 are configured to transmit a sounding transmission according to a power mode having power control parameters corresponding to the cell-specific sounding pattern configuration. For instance, the power sub-circuitry 1000 and/or power instructions 1005 may be configured to derive a transmit power based on the power control parameters and an offset specific to the scheduled entity 900, wherein the power sub-circuitry 1000 and/or power instructions 1005 is then further configured to transmit the sounding transmission according to the transmit power. Here, it is contemplated that such offset may be associated with any of various parameters (e.g., a traffic load level, a priority, and/or a tolerable interference level).

Alternatively, the power sub-circuitry 1000 and/or power instructions 1005 may be configured to transmit the sounding transmission according to a fixed reference power associated with the power mode. For example, the power sub-circuitry 1000 and/or power instructions 1005 may be configured to transmit the sounding transmission according to a transmit power equal to the fixed reference power. The power sub-circuitry 1000 and/or power instructions 1005 may also be further configured to derive a transmit power based on the fixed reference power or power control parameters associated with a particular uplink channel, wherein the power sub-circuitry 1000 and/or power instructions 1005 is configured to transmit the sounding transmission according to the transmit power.

In another aspect of the disclosure, it is contemplated that the measurement sub-circuitry 1010 and/or measurement instructions 1015 may be configured to perform a sounding measurement according to a cell-specific measurement pattern configuration. For instance, it is contemplated that the measurement sub-circuitry 1010 and/or measurement instructions 1015 may be configured to perform a sounding measurement according to a cell-specific measurement pattern configuration that specifies a type of measurement to perform on a particular set of resources. It is also contemplated that the measurement sub-circuitry 1010 and/or measurement instructions 1015 may be configured to report the sounding measurement according to the cell-specific measurement pattern configuration. For instance, the measurement sub-circuitry 1010 and/or measurement instructions 1015 may be configured to report multiple sounding measurements measured via different resources according to the cell-specific measurement pattern configuration (e.g., an individual reporting of each of the multiple sounding measurements, an aggregate value associated with the multiple sounding measurements, etc.). It is also contemplated that the measurement sub-circuitry 1010 and/or measurement instructions 1015 may be configured to trigger a reporting of the sounding measurement according to the cell-specific measurement pattern configuration.

In FIG. 11, a flow chart is provided, which illustrates an exemplary scheduled entity process for performing some aspects of the disclosure. As described below, some or all illustrated features may be omitted in a particular implementation within the scope of the present disclosure, and some illustrated features may not be required for implementation of all embodiments. In some examples, the process 1100 may be carried out by the scheduled entity 900 illustrated in FIG. 9. In some examples, the process 1100 may be carried out by any suitable apparatus or means for carrying out the functions or algorithm described below.

Process 1100 begins at block 1110 with the scheduled entity 900 receiving a cell-specific sounding pattern configuration having at least one of a sounding transmission pattern or a sounding measurement pattern uniformly applicable to each of a plurality of scheduled entities served by a scheduling entity (e.g., scheduling entity 600) such that the cell-specific sounding pattern configuration has a different pattern than a cell-specific sounding pattern configuration associated with at least one other cell (e.g., a neighbor cell). Process 1100 then proceeds to block 1120 where the scheduled entity 900 identifies cell-specific resources associated with the cell-specific sounding pattern configuration. Process 1100 then concludes at block 1130 where the scheduled entity 900 configures at least one of a sounding transmission or a sounding measurement according to the cell-specific resources associated with the cell-specific sounding pattern configuration.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Other aspects, features, and embodiments of the present invention will become apparent to those of ordinary skill in the art, upon reviewing the above description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may have been discussed as device, system, or method embodiments it should be understood that such exemplary embodiments can be implemented in various devices, systems, and methods.

What is claimed is:

1. A scheduling entity for wireless communication comprising:
    an identifying circuitry configured to identify a plurality of scheduled entities served by the scheduling entity;
    a generating circuitry configured to generate a first cell-specific sounding pattern configuration from among a plurality of cell-specific sounding pattern configurations wherein a number of the plurality of cell-specific sounding pattern configurations is greater than or equal to a specified number of cells in a plurality of neighboring cells, and is based on a first number of symbols used by each of the plurality of neighboring cell for sounding transmissions and sounding measurements, and a second number of symbols used by each of the plurality of neighboring cells for sounding transmissions, each unique of the plurality of cell-specific sounding pattern configurations comprising a sounding transmission pattern that identifies respective cell-specific configuration resources to use for sounding transmissions, and a sounding measurement pattern that identifies respective cell-specific configuration resources to use for sounding measurements, wherein:
        each combination of the respective cell-specific configuration resources to use for sounding transmissions and the respective cell-specific configuration resources to use for sounding measurements of each of the plurality of cell-specific sounding pattern configurations is different,
        each of the plurality of cell-specific sounding pattern configurations enables scheduled entities in a different cell of the plurality of neighboring cells to listen to scheduled entities in each of the other cells in the plurality of neighboring cells, and
        the first cell-specific sounding pattern configuration is uniformly applicable to each of the plurality of scheduled entities; and
    a transmitting circuitry configured to transmit the first cell-specific sounding pattern configuration to each of the plurality of scheduled entities served by the scheduling entity.

2. The scheduling entity of claim 1, wherein the generating circuitry further comprises a sounding power circuitry configured to convey a power mode to at least one of the plurality of scheduled entities, and wherein the power mode has corresponding power control parameters associated with a sounding transmission.

3. The scheduling entity of claim 2, wherein the sounding power circuitry is configured to instruct at least one of the plurality of scheduled entities to perform a power control derivation based on the power control parameters and an offset specific to the at least one of the plurality of scheduled entities.

4. The scheduling entity of claim 3, wherein the sounding power circuitry is configured to determine the offset based on at least one of a traffic load level, a priority, or a tolerable interference level.

5. The scheduling entity of claim 2, wherein the sounding power circuitry is configured to perform at least one of:
    convey a power mode associated with a fixed reference power, wherein each of the plurality of scheduled entities are instructed that a corresponding sounding transmission shall be transmitted according to the fixed reference power; or
    instruct at least one of the plurality of scheduled entities to perform a power control derivation based on power control parameters associated with a particular uplink channel.

6. The scheduling entity of claim 1, wherein the generating circuitry further comprises sounding measurement circuitry configured to generate a cell-specific measurement pattern configuration that specifies a reporting of multiple sounding measurements measured from different resources, the reporting corresponding to a maximum measurement of the multiple sounding measurements.

7. The scheduling entity of claim 1, wherein the cell-specific measurement pattern configuration specifies a reporting of multiple sounding measurements measured from different resources, the reporting corresponding to an individual reporting of each of the multiple sounding measurements.

8. The scheduling entity of claim 1, wherein the cell-specific measurement pattern configuration specifies a reporting of multiple sounding measurements measured from different resources, the reporting corresponding to an aggregate value associated with the multiple sounding measurements.

9. The scheduling entity of claim 1, wherein the cell-specific measurement pattern configuration specifies a trigger for reporting sounding measurements.

10. A method of wireless communication operable at a scheduling entity, the method comprising:
    identifying a plurality of scheduled entities served by the scheduling entity;
    generating a first cell-specific sounding pattern configuration from among a plurality of cell-specific sounding pattern configurations, wherein a number of the plurality of cell-specific sounding pattern configurations is greater than or equal to a specified number of cells in a plurality of neighboring cells, and is based on a first number of symbols used by each of the plurality of neighboring cell for sounding transmissions and sounding measurements, and a second number of symbols used by each of the plurality of neighboring cells for sounding transmissions, each of the plurality of cell-specific sounding pattern configurations comprising a sounding transmission pattern that identifies respective cell-specific configuration resources to use for sounding transmissions, and a sounding measurement pattern that identifies respective cell-specific configuration resources to use for sounding measurements, wherein:
        each combination of the respective cell-specific configuration resources to use for sounding transmissions and the respective cell-specific configuration resources to use for sounding measurements of each of the plurality of cell-specific sounding pattern configurations is different,
        each of the plurality of cell-specific sounding pattern configurations enables scheduled entities in a different cell of the plurality of neighboring cells to listen to scheduled entities in each of the other cells in the plurality of neighboring cells, and
        the first cell-specific sounding pattern configuration is uniformly applicable to each of the plurality of scheduled entities; and
    transmitting the first cell-specific sounding pattern configuration to each of the plurality of scheduled entities served by the scheduling entity.

11. The method of claim 10, wherein the generating comprises generating a cell-specific measurement pattern configuration that specifies a type of measurement to perform on a particular set of resources.

12. The method of claim 11, wherein the cell-specific measurement pattern configuration further specifies a reporting of multiple sounding measurements measured from different resources, the reporting corresponding to a maximum measurement of the multiple sounding measurements.

13. The method of claim 10, wherein the generating comprises defining each of the plurality of cell-specific sounding pattern configurations jointly over at least two of a time domain, a frequency domain, or a code sequence domain, and wherein each of the plurality of cell-specific sounding pattern configurations is defined by a respective joint configuration over the at least two of the time domain, the frequency domain, or the code sequence domain, and the respective joint configuration of each of the plurality of cell-specific sounding pattern configurations is different.

14. The method of claim 10, wherein the transmitting comprises conveying a power mode to at least one of the plurality of scheduled entities, and wherein the power mode has corresponding power control parameters associated with a sounding transmission.

15. The method of claim 10, wherein the transmitting comprises transmitting the cell-specific sounding pattern configuration via a unicast transmission, a multicast transmission, or a broadcast transmission.

16. A method of wireless communication operable at a scheduled entity, the method comprising:
 receiving a first cell-specific sounding pattern configuration from among a plurality of cell-specific sounding pattern configurations, wherein a number of the plurality of cell-specific sounding pattern configurations is greater than or equal to a specified number of cells in a plurality of neighboring cells, and is based on a first number of symbols used by each of the plurality of neighboring cell for sounding transmissions and sounding measurements, and a second number of symbols used by each of the plurality of neighboring cells for sounding transmissions, each of the plurality of cell-specific sounding pattern configurations comprising a sounding transmission pattern that identifies respective cell-specific configuration resources to use for sounding transmissions, and a sounding measurement pattern that identifies respective cell-specific configuration resources to use for sounding measurements, wherein:
  each combination of the respective cell-specific configuration resources to use for sounding transmissions and the respective cell-specific configuration resources to use for sounding measurements of each of the plurality of cell-specific sounding pattern configurations is different,
  each of the plurality of cell-specific sounding pattern configurations enables scheduled entities in a different cell of the plurality of neighboring cells to listen to scheduled entities in each of the other cells in the plurality of neighboring cells, and
  the first cell-specific sounding pattern configuration is uniformly applicable to each of a plurality of scheduled entities served by a scheduling entity;
 identifying the cell-specific configuration resources associated with the first cell-specific sounding pattern configuration; and
 configuring at least one of a sounding transmission or a sounding measurement according to the cell-specific configuration resources associated with the first cell-specific sounding pattern configuration.

17. The method of claim 16, wherein each of the plurality of cell-specific sounding pattern configurations is configured jointly over at least two of a time domain, a frequency domain, or a code sequence domain, and wherein each of the plurality of cell-specific sounding pattern configurations is defined by a respective joint configuration over the at least two of the time domain, the frequency domain, or the code sequence domain, and the respective joint configuration of each of the plurality of cell-specific sounding pattern configurations is different.

18. The method of claim 16, wherein the configuring comprises configuring the sounding transmission according to a power mode associated with the first cell-specific sounding pattern configuration.

19. The method of claim 16, wherein the configuring comprises configuring the sounding measurement according to a cell-specific measurement pattern configuration that specifies a type of measurement to perform on a particular set of resources.

20. The method of claim 16, wherein the receiving comprises receiving the first cell-specific sounding pattern configuration via a unicast transmission, a multicast transmission, or a broadcast transmission.

21. The method of claim 16, wherein the cell-specific measurement pattern configuration further specifies a reporting of multiple sounding measurements measured from different resources, the reporting corresponding to a maximum measurement of the multiple sounding measurements.

22. The method of claim 16, further comprising:
 conditioning the configuring at least one of a sounding transmission or a sounding measurement according to the cell-specific configuration resources associated with the first cell-specific sounding pattern configuration, on a determination that the scheduled entity has traffic activity.

23. A scheduled entity for wireless communication comprising:
 a receiving circuitry configured to receive a first cell-specific sounding pattern configuration from among a plurality of cell-specific sounding pattern configurations, wherein a number of the plurality of cell-specific sounding pattern configurations is greater than or equal to a specified number of cells in a plurality of neighboring cells, and is based on a first number of symbols used by each of the plurality of neighboring cell for sounding transmissions and sounding measurements, and a second number of symbols used by each of the plurality of neighboring cells for sounding transmissions, each of the plurality of cell-specific sounding pattern configurations comprising a sounding transmission pattern that identifies respective cell-specific configuration resources to use for sounding transmissions, and a sounding measurement pattern that identifies respective cell-specific configuration resources to use for sounding measurements, wherein:
  each combination of the respective cell-specific configuration resources to use for sounding transmissions and the respective cell-specific configuration resources to use for sounding measurements of each of the plurality of cell-specific sounding pattern configurations is different,
  each of the plurality of cell-specific sounding pattern configurations enables scheduled entities in a different cell of the plurality of neighboring cells to listen to scheduled entities in each of the other cells in the plurality of neighboring cells, and the first cell-specific sounding pattern configuration is uniformly applicable to each of a plurality of scheduled entities served by a scheduling entity;

an identifying circuitry configured to identify the cell-specific configuration resources associated with the first cell-specific sounding pattern configuration; and a sounding circuitry configured to configure at least one of a sounding transmission or a sounding measurement according to the cell-specific configuration resources associated with the first cell-specific sounding pattern configuration.

24. The scheduled entity of claim 23, wherein the sounding circuitry further comprises power circuitry configured to transmit the sounding transmission according to a power mode having power control parameters corresponding to the first cell-specific sounding pattern configuration.

25. The scheduled entity of claim 24, wherein the power circuitry is configured to derive a transmit power based on the power control parameters and an offset specific to the scheduled entity, and wherein the power circuitry is configured to transmit the sounding transmission according to the transmit power.

26. The scheduled entity of claim 25, wherein the offset is associated with at least one of a traffic load level, a priority, or a tolerable interference level.

27. The scheduled entity of claim 24, wherein the power circuitry is configured to transmit the sounding transmission according to a transmit power, and wherein the power circuitry is further configured to derive the transmit power based on power control parameters associated with a particular uplink channel or a fixed reference power associated with the power mode.

28. The scheduled entity of claim 23, wherein the sounding circuitry further comprises measurement circuitry configured to perform a sounding measurement according to a cell-specific measurement pattern configuration, and wherein the measurement circuitry is further configured to report the sounding measurement according to the cell-specific measurement pattern configuration.

29. The scheduled entity of claim 28, wherein the measurement circuitry is configured to report multiple sounding measurements measured via from different resources according to the cell-specific measurement pattern configuration, wherein the report corresponds to a maximum measurement of the multiple sounding measurements.

30. The scheduled entity of claim 28, wherein the measurement circuitry is configured to trigger a reporting of the sounding measurement according to the cell-specific measurement pattern configuration.

\* \* \* \* \*